United States Patent Office
3,766,152
Patented Oct. 16, 1973

3,766,152
PROCESS FOR POLYMERIZING
CONJUGATED DIENES
Adel Farhan Halasa, Bath, Ohio, assignor to The
Firestone Tire & Rubber Company, Akron, Ohio
No Drawing. Filed July 25, 1972, Ser. No. 274,928
Int. Cl. C08f 19/08, 1/28; C08d 1/32
U.S. Cl. 260—83.7
18 Claims

ABSTRACT OF THE DISCLOSURE

Conjugated dienes are polymerized by a new catalyst system which permits control of the molecular weight range, gives a higher Mooney value, and gives a more easily processed product. This catalyst system comprises (1) an alkyl lithium compound having 1–10 carbon atoms, (2) a secondary alkyl chloride selected from the class of secondary butyl chloride, secondary amyl chloride and isopropyl chloride, and (3) a divinyl aryl compound, preferably divinyl benzene. In the use of the combination of the secondary alkyl chloride and the divinyl benzene with the lithium hydrocarbon, a synergistic effect is achieved by which polymer properties are improved notably over the improvements effected by either of these components when used individually or in combinations of only two such components in such polymerizations.

BACKGROUND OF THE INVENTION

Field of the invention

This invention relates to a process for the polymerization of conjugated dienes, such as butadiene and isoprene, using a catalyst composition comprising an alkyl lithium, a secondary alkyl chloride, and a divinyl aryl, such as divinyl benzene.

Related prior art

The polymerization of conjugated dienes can be effected in a variety of methods. However, there are various disadvantages in the various methods presently known including undesirable or uncontrollable properties in the products, such as lack of control of molecular weight, molecular weight distribution and processibility of the polymers. In many cases, such as with "Alfin" catalyst systems, the molecular weights are too high, namely approximately 5,000,000, or even higher, which polymers are difficult to process for commercial use.

In some cases, such as with an alkyl lithium-ether complex, for example n-butyllithium with tetrahydrofuran, the molecular weight distribution is rather narrow and likewise the resultant product is difficult to process. Likewise when an alkyl lithium is modified with a secondary alkyl chloride, alone, the product is generally of narrow molecular weight distribution and therefore more difficult to process.

In cases where butadiene, or butadiene and styrene, are polymerized in the presence of a small amount of divinyl benzene, such as in British Patent No. 968,756, continuous polymerization gives considerable gel formation which is undesirable.

It is known in the prior art that butadiene may be polymerized in the presence of various alkali metal and alkali metal alkyl catalysts in the presence of divinyl benzene. Moreover, the polymerization of conjugated dienes, such as butadiene, using a lithium catalyst modified by the presence of various hydrocarbon halogen derivatives has been disclosed in a general way (South African Patent 621,162). However patentee merely discloses alkyl halides in general, without indicating any preferred structure of the alkyl group, except to indicate a preference for n-butyl bromide. Moreover, there is no mention of the use of a second modifier such as divinyl benzene.

Polybutadienes prepared by the use of n-butyl lithium in n-hexane have about 8–10% 1,2-, 53–54% trans-1,4 and 35–37% cis-1,4 configurations, which polymers do not have enough 1,2- configuration for some desired properties. By using polar modifiers or solvents, such as ethers, amines, etc., the vinyl content can be increased to up to 50–70%. However, the molecular weight distribution in such cases is so narrow as to give poor processibility. Moreover, the polar modifiers act as chain terminators and prevent active polymer products that might be coupled or otherwise post-treated to improve processibility. Processibility is very important for commercial rubber tire production. Among other disadvantages poor processibility results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

SUMMARY OF THE INVENTION

In accordance with the present invention, it has now been found that conjugated dienes, such as butadiene and isoprene, can be polymerized by the catalyst system comprising an alkyl lithium compound having 1–10 carbon atoms, a secondary alkyl chloride, such as isopropyl chloride, secondary-butyl chloride and secondary-amyl chloride, and a divinyl aryl compound to give polymers of broader molecular weight distribution than obtained when the alkyl lithium and secondary-alkyl chloride are used by themselves. Moreover, this catalyst system makes it possible to control the average molecular weight, as well as the molecular weight distribution, and provides a polymer having improved processibility.

Among other improved properties it is found that the use of the divinyl aryl compound, such as divinyl benzene, in combination with the alkyl lithium and the secondary-alkyl chloride gives a synergistic effect as compared to the use of the individual catalyst components and their additive effect. The alkyl lithium is used in a proportion of 0.1–2 millimoles per 100 parts by weight of monomers. The secondary alkyl chloride is used in a proportion of 0.5–3 millimoles per millimole of alkyl lithium, preferably at least 0.1 millimole per 100 monomer, and the divinyl aryl or divinyl benzene is used in a proportion of 0.2–3, preferably 0.5–3 millimoles per millimole of secondary alkyl chloride, preferably at least 0.1 millimole per 100 parts of monomer. The effect of these proportions is shown in a remarkable improvement in the Mooney viscosity, improved control of intrinsic viscosity and in the improved processibility of the polymers.

The hydrocarbon portion of the lithium hydrocarbon component has 1–10 carbon atoms, and even though larger groups can be used there is no particular advantage. The hydrocarbon portion is preferably alkyl, but may also be aryl, including alkaryl or aralkyl, and the lithium can be attached to a primary, secondary or tertiary carbon atom. Typical lithium hydrocarbon compounds that can be used include compounds in which the hydrocarbon portion is methyl, ethyl, n-propyl, isopropyl, n-butyl, sec.-butyl, t-butyl, n-amyl, sec.-amyl, t-amyl, n-hexyl, sec.-hexyl, t-hexyl, n-octyl, n-decyl, 1-methyl-2,4-diethylpentyl, phenyl, tolyl, ethylphenyl, naphthyl, benzyl, phenethyl, etc. Preferably the lithium hydrocarbon is an n-alkyl such as n-butyl lithium, n-octyl lithium, etc.

In addition to divinyl benzene, which is preferred, typical other divinyl aryls that may be used include: divinyl toluene, divinyl xylene, divinyl ethylbenzene, divinyl naphthalene, divinyl methylnaphthalene, divinyl dimethylnaphthalene, divinyl ethylnaphthalene, divinyl diphenyl, divinyl methyldiphenyl, divinyl isopropyldiphenyl, and other divinyl aryl hydrocarbons preferably having no more than 20 carbon atoms therein.

The polymerization temperature is advantageously no higher than 100° C., and is preferably no higher than 70° C. While higher temperatures can be used, even as high as 150° C., the yield and molecular weight decrease when temperatures exceed 100° C. Polybutadienes produced at temperatures of 70° C. or lower have molecular weights as high as 1,000,000, generally 100,000 to 500,000. Yields as high as 98–99% are easily produced. The 1,2-configuration in the polymer is at least 10% and generally in the range of 15–20%.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane, n-heptane, etc. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either.

Conjugated dienes that may be polymerized, either alone or with each other, in accordance with this invention include: 1,3-butadiene, isoprene, chloroprene, 2-phenyl-1,3-butadiene, piperylene, etc.

In the polymerizations of this invention, in addition to the diene comonomers may also be used where the comonomers impart desirable properties and do not detract from the polymer properties. The comonomers are preferably vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloro-naphthalene, 1 - isopropenyl - 5 - chloronaphthalene, vinyl diphenyl, vinyl diphenylethane, 4 - vinyl - 4' - methyldiphenyl, 4-vinyl - 4' - chlorodiphenyl, and the like. Preferably such comonomers have no more than 12 carbon atoms. Where such comonomers are to be used, generally at least 1%, preferably at least 5% by weight should be used and as much as 60%, preferably no more than 30% may be used.

In referring above to millimoles of catalyst this corresponds to the millimoles of lithium hydrocarbon since the catalyst is regarded or at least calculated as a complex of the lithium compound with the other catalyst components.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

Various experiments illustrating synergistic effect of sec.-BuCl and DVB (16 hours at 50° C.)

A number of 28 oz. polymerization bottles are charged, after being flushed with nitrogen, with 60 gm. of butadiene in 260 gm. of hexane solution. The bottles are sealed with caps having an opening covered by a rubber liner covered on the inside with aluminum foil, and the bottle and its contents are brought to a temperature of 30° C. The respective catalyst combinations described below are injected as a hexane solution by a hypodermic syringe inserted through the rubber liner in the sealing cap of the bottle. The bottles are placed in a polymerization bath maintained at 50° C. and rotated for 16 hours. The results are tabulated below:

| Experiment | mM. nBuLi | mM. sec.BuCl | mM. DVB | DSV | At ML[4] 212° F. | Percent gel |
|---|---|---|---|---|---|---|
| A | 0.7 | None | None | 1.68 | 12.5 | 0.00 |
| B | 0.7 | 0.35 | None | 2.31 | 54.0 | 0.00 |
| C | 0.7 | 0.7 | None | 2.05 | 29.0 | 0.00 |
| D | 0.7 | 1.0 | None | 2.25 | 23.0 | 0.00 |
| E | 0.7 | 2.0 | None | 2.15 | 35.0 | 0.00 |
| F | 0.7 | 0.70 | 0.2 | 3.38 | 162.0 | 0.00 |
| G | 0.7 | 1.05 | 0.2 | 3.90 | 180.0 | 0.00 |
| H | 0.7 | 1.40 | 0.2 | 2.70 | 84.0 | 0.00 |
| I | 0.7 | 2.0 | 0.2 | 2.84 | 82.0 | 0.00 |
| J | 0.7 | 2.4 | 0.2 | 2.14 | 31.0 | 0.00 |
| K | 0.7 | 3.0 | 0.2 | 2.14 | 36.0 | 0.00 |
| L | 0.7 | None | 0.4 | 1.32 | 12.0 | 0.00 |
| M | 0.7 | None | 0.6 | 2.11 | 36.0 | 0.00 |
| N | 0.7 | None | 0.8 | 2.21 | 43.0 | 0.00 |

EXAMPLE II

The procedure of Example I is repeated a number of times using the components and proportions shown together with the results in the table below:

| Experiment | mM. nBuLi | mM. sec.BuCl | mM. DVB | DSV | At ML[4] 212° F. | Percent gel |
|---|---|---|---|---|---|---|
| A | 0.5 | None | None | 2.30 | 32.0 | 0.00 |
| B | 0.5 | 0.5 | None | 2.10 | 55.0 | 2.00 |
| C | 0.5 | 2.0 | None | 1.20 | 56.0 | 0.00 |
| D | 0.5 | 0.5 | 0.1 | 4.11 | 175.0 | 0.00 |
| E | 0.5 | 0.5 | 0.4 | 4.60 | 176.0 | 0.00 |
| F | 0.5 | 0.5 | 0.5 | 6.10 | 150.0 | 0.00 |
| G | 0.5 | 1.0 | 0.5 | 4.36 | 148.0 | 0.00 |
| H | 0.5 | 1.0 | 1.0 | 4.01 | 165.0 | 0.00 |
| I | 0.5 | 1.0 | 1.5 | 3.05 | 122.0 | 0.00 |
| J | 0.5 | 1.0 | 2.0 | 3.81 | 170.0 | 0.00 |
| K | 0.5 | None | 2.0 | 1.21 | 33.0 | 0.00 |
| L | 0.5 | None | 3.0 | 1.81 | 67.0 | 21.0 |

EXAMPLE III

The procedure of Example I is repeated a number of times using isoprene in place of butadiene and the catalyst components and proportions shown with the results in the table below. In this case the synergistic improvement is shown in attaining the desired DSV range which is advantageously 4.5–10, preferably 6–8. Best results are obtained when the DVB is used in approximately the same molar proportion as the secondary alkyl chloride.

| Experiment | mM. nBuLi | mM. sec. BuCl | mM. DVB | DSV | Percent gel |
|---|---|---|---|---|---|
| A | 0.7 | None | None | 0.42 | 0.00 |
| B | 0.7 | 2.0 | None | 3.41 | 0.00 |
| C | 0.7 | 0.5 | 0.1 | 4.41 | 0.00 |
| D | 0.7 | 0.5 | 0.5 | 6.32 | 0.00 |
| E | 0.7 | 1.0 | 0.5 | 8.25 | 8.00 |
| F | 0.7 | 1.0 | 1.0 | 6.33 | 0.00 |
| G | 0.7 | None | 2.0 | 0.49 | 0.00 |

The synergistic effect of the combination is shown by the fact that increased proportions of either the secondary chloride or DBV alone with the nBuLi show nowhere near the desired DSV whereas much smaller proportions of each when used together show a remarkable increase in DSV, preferably with the two used in approximately equimolar proportions.

EXAMPLE IV

The procedure of Example I is repeated a number of times using sec.-amyl chloride in place of the sec.-butyl chloride with the results shown in the table below. The sec.-amyl chloride is slightly less effective in the lower concentrations than the sec.-butyl chloride and at least 0.2 or preferably at least 0.3 millimole should be used.

With sec.-Amyl Cl

| Experiment | mM. nBuLi | mM. sec.AmCl | mM. DVB | DSV | At ML⁴ 212° F. | Percent Gel |
|---|---|---|---|---|---|---|
| A | 0.7 | None | None | 1.05 | 5.0 | 0.0 |
| B | 0.7 | 2.0 | None | 1.62 | 32.0 | 0.0 |
| C | 0.7 | 0.5 | 0.1 | 1.82 | 39.0 | 0.0 |
| D | 0.7 | 0.5 | 0.5 | 2.21 | 63.0 | 0.0 |
| E | 0.7 | 1.0 | 0.5 | 2.41 | 86.0 | 0.0 |
| F | 0.7 | 1.0 | 1.0 | 2.61 | 93.0 | 0.0 |
| G | 0.7 | None | 2.0 | 2.11 | 43.0 | 0.0 |

EXAMPLE V

The procedure of Example I is repeated a number of times with similar results using an equivalent amount respectively of 1,4-divinylnaphthalene, 4,4'-divinyldiphenyl and divinyltoluene.

EXAMPLE VI

The procedure of Example I is repeated with similar results using in place of the secondary butyl chloride an equivalent amount of isopropyl chloride.

EXAMPLE VII

The procedure of Example I is repeated a number of times with similar results using in place of the n-butyl lithium an equivalent amount respectively of n-hexyl lithium, n-amyl lithium and n-octyl lithium.

The "dilute solution viscosity" referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for the polymerization of a monomer composition containing at least 70 percent conjugated diene comprising the steps of maintaining said monomer composition at a temperature of no more than 100° C. in intimate contact with a catalyst composition consisting essentially of:
   (a) a lithium hydrocarbon haivng 1–10 carbon atoms therein selected from the class consisting of lithium alkyls and lithium aryls;
   (b) a secondary alkyl chloride selected from the class consisting of secondary butyl chloride, secondary amyl chloride and isopropyl chloride; and
   (c) a divinyl aryl compound having no more than 20 carbon atoms selected from the class consisting of divinyl derivatives of benzene, naphthalene, diphenyl and the derivatives thereof having no more than two derivative groups and said derivative groups are selected from the class of alkyl, aryl and cycloalkyl groups, the concentration of said catalyst composition comprising 0.1–2 millimoles of lithium hydrocarbon per 100 grams of said monomer composition, said secondary alkyl chloride being present in said catalyst composition in a ratio of 0.5–3 moles per mole of lithium hydrocarbon, there being at least 0.1 millimole of said chloride per 100 grams of monomer, and said divinyl aryl compound being present in a ratio of 0.2–3 moles per mole of lithium hydrocarbon and there being at least 0.1 millimoles present per 100 grams of monomer, said polymerization being conducted for a period of at least one hour.

2. The process of claim 1 in which said temperature is no more than 70° C.

3. The process of claim 2 in which said conjugated diene is 1,3-butadiene.

4. The process of claim 2 in which said monomer composition is essentially all 1,3-butadiene.

5. The process of claim 4 in which said lithium hydrocarbon is a lithium n-alkyl.

6. The process of claim 4 in which said polymerization is conducted for at least 10 hours.

7. The process of claim 4 in which said secondary alkyl chloride is secondary butyl chloride.

8. The process of claim 7 in which said lithium hydrocarbon is lithium n-butyl.

9. The process of claim 8 in which said divinyl aryl is divinyl benzene.

10. The process of claim 9 in which said polymerization is conducted in n-hexane solution.

11. The process of claim 10 in which said monomer is in n-hexane solution at a concentration of 10–25 percent by weight.

12. The process of claim 1 in which said catalyst complex is present at a concentration of 0.3–1.0 millimoles of lithium hydrocarbon complex per 100 grams of said monomer.

13. The process of claim 12 in which said monomer composition is present at a concentration of 10–25 percent by weight.

14. The process of claim 13 in which said liquid hydrocarbon is n-hexane.

15. The process of claim 1 in which said monomer composition comprises 70–95 percent by weight of 1,3-butadiene and 5–30 percent by weight of styrene.

16. The process of claim 1 in which said lithium hydrocarbon is n-butyl lithium.

17. The process of claim 17 in which said divinyl aryl is divinyl benzene.

18. The process of claim 17 in which said secondary alkyl chloride is secondary butyl chloride.

References Cited

UNITED STATES PATENTS

| 3,280,084 | 10/1966 | Zelinski et al. | 260—880 |
| 3,363,659 | 1/1968 | Keckler | 260—880 |
| 3,429,829 | 2/1969 | Kahle | 260—94.2 M |

JAMES A. SEIDLECK, Primary Examiner

U.S. Cl. X.R.

260—82.1, 94.2 M

PO-1050
(5/69)

UNITED STATES PATENT OFFICE
CERTIFICATE OF CORRECTION

Patent No. 3,766,152  Dated October 16, 1973

Inventor(s) Adel Farhan Halasa

It is certified that error appears in the above-identified patent and that said Letters Patent are hereby corrected as shown below:

Col. 1, Line 53, the comma following "chloride" should be deleted.

Col. 4, Line 65, "DBV" should read --DVB--

Col. 5, Line 5, the heading "Percent Ge" should read --Percent Gel--

Col. 5, Line 50, "haivng" should read --having--

Col. 6, Line 47, "claim 17" should read --claim 16--

Signed and sealed this 26th day of March 1974.

(SEAL)
Attest:

EDWARD M. FLETCHER, JR.
Attesting Officer

C. MARSHALL DANN
Commissioner of Patents